United States Patent Office 3,439,801
Patented Apr. 22, 1969

3,439,801
PROCESS FOR IMPROVING THE BRIGHTNESS OF CLAY
Horton H. Morris and James P. Olivier, Macon, Ga., assignors to Freeport Sulphur Company, New York, N.Y., a corporation of Delaware
No Drawing. Filed Oct. 15, 1965, Ser. No. 496,707
Int. Cl. B03d 3/00
U.S. Cl. 209—5                                12 Claims

ABSTRACT OF THE DISCLOSURE

Process for removing discoloring impurities such as those that are organic or graphitic in nature from a clay slip. The process consists essentially of intimately contacting an aqueous slip of a fine milled clay with a water-insoluble, non-ionizable organic liquid, and thereupon recovering the clay from the separated clay water phase. The organic liquid is the sole chemical reagent necessary for the effective separation of the discoloring impurities from the fine milled clay in the slip.

---

The present invention relates to means for obtaining a kaolin clay of improved brightness characteristics. More specifically, the present invention deals with a process for improving the brightness of kaolin clays by a selective removal of discoloring impurities from the kaolin clay by an organic liquid extraction process.

In the United States, kaolin clays are produced in abundance from North Carolina, South Carolina, Georgia, Florida and Vermont. Kaolin clays denote a large variety of alumino silicate-bearing rocks of varying compositions and degrees of purity. Typically, kaolin clays comprise a substantial portion of kaolinite and may additionally have varying amounts of such minerals as dickite, nacrite, halloysite, montmorillonite (bentonite), attapulgite, fuller's earth and illite.

The end uses for which kaolin clays are produced usually demand that the clays be as bright as possible, the commercial value of kaolin clays being largely determined by their "brightness." The brightness of kaolin clays is conventionally and normally designated by "GE" values determined according to TAPPI (Technical Association of the Pulp and Paper Industry) Method T 645 m–54, as reported in the Testing Methods—Recommended Practices—Specifications of the Technical Association of the Pulp and Paper Industry.

Kaolin clays as mined are generally discolored by impurities. A pure kaolinite crystal has the elements hydrogen, oxygen, aluminum and silicon and the art has referred to the kaolinite crystal as $Al_2O_3 \cdot 2SiO_2 \cdot 2H_2O$. In addition to those elements, at least two dozen other elements have been detected by chemical analyses. These include carbon, iron, magnesium, calcium, potassium, sodium and titanium. Since pure kaolinite is colorless, the discoloration of kaolin clays is attributed to the other elements which exist either in inorganic or organic form in the kaolin clays.

The exact mineralogical composition of kaolin clays is not completely understood. It is known that at least some of the potassium found in kaolin clays is present as muscovite mica, that some of the silicon is present as quartz and that some of the titanium is present as rutile and anatase. Pure kaolinite is essentially a white mineral while kaolin clay as found in nature, and as commercially produced, is discolored. It has long been recognized that this discoloration which reduces the brightness of a kaolin clay can be due to, among other things, the various iron and titanium-containing impurities present in the clay. Titanium dioxide ($TiO_2$), usually n the form of anatase and rutile, is recognized as a discoloring impurity in kaolin; presumably this is because iron is incorporated into the crystalline lattice of the anatase and rutile, since pure anatase or rutile is ordinarily a very white substance. As little as 1% of an iron-containing material, or less, can suffice to render titanium dioxide highly colored.

Among the methods heretofore advanced for improving the brightness of kaolin clays was subjecting a particular kaolin clay to a froth flotation process to remove those fractions having the most discoloration. Alternatively, it has been suggested to subject a kaolin clay to chemical bleaching with a strong reducing agent such as sodium or zinc hydrosulfite. Size classification has also been used to obtain clay fractions of improved brightness.

The prior art methods have encountered substantial difficulties. For example, size classification has not proven effective where the discoloring impurities have a particle size in the same range as the desired clay product. Chemical bleaching in general has a small effect on many impurities.

An object of the present invention is to provide a process for improving brightness of kaolin clays as found in nature or as conventionally processed.

An additional object of the instant invention is to provide a proce  for improving the brightness of kaolin clays, which clays may have the same particle size of discoloring impurities as the desired clay product.

Another object of the invention is to provide a process for improving the brightness of kaolin clays which avoids the necessity of a froth flotation step.

Other objects of the invention will be obvious from the following description and the appended claims.

As disclosed in commonly assigned U.S. Patent 3,171,-718, which issued on March 2, 1965, kaolin clays of improved brightness can be obtained by a process of delamination. In accordance with the instant invention, it has been found that the brightness of kaolin clays is unexpectedly increased if the delaminated clay, in an aqueous slurry, is intimately contacted with a substantially water-insoluble (solubility of less than one percent by weight of aqueous phase at the operating temperature of the process), non-ionizable (when in contact with water) organic material which is liquid under the conditions under which the delaminated kaolin clay is contacted with the organic material and which is further capable of wetting or partially wetting, in preference to water, all or part of the surface of the discoloring impurities in the delaminated clay such that two liquid phases are formed and maintained in the process. Any of a very wide variety of organic liquids or organic materials which are liquid under the temperature of treatment of 40° F. to 200° F., but may be solid otherwise, can be employed. The organic liquid should give an interfacial tension against water of from 20 to 55 dynes per centimeter at temperatures of the process. After treatment with the organic material the aqueous and organic phases are allowed or caused to separate and the delaminated clay water layer removed. The delaminated clay water slip may then be treated by conventional techniques, e.g. flocculation and filtration, and the solid clay dried.

In another but less preferred embodiment of the invention, the brightness of kaolin clay is unexpectedly increased by contacting an aqueous slurry of kaolin clay with an organic material, as outlined above with reference to the treatment of delaminated clay, the discolored kaolin clay slurry in this embodiment being subjected to a milling operation in order to make the discoloring impurities separable therefrom. The milling operation may be carried out prior to, simultaneous with, or subsequent to, treatment of the slurry with the organic material, the milling operation being accomplished by a colloid mill, Waring Blendor or other equivalent apparatus. When carrying out the milling operation in the presence of the aqueous clay slurry, such milling should be sufficient to cause interparticle collision and friction of the organic liquid and clay particles suitable for the types of starting kaolin clay. If desired, the milling operation can be performed in the dry state prior to preparation of the aqueous slurry and its treatment with the organic material.

In the process of the present invention, of particular value as the organic material are the unsubstituted branched or unbranched paraffin hydrocarbons, aromatic hydrocarbons unsubstituted except for branched or unbranched hydrocarbon substituents and halogenated derivatives of such paraffin hydrocarbons and aromatic hydrocarbons. Examples thereof are carbon tetrachloride, toluene, kerosene, 1,2-dichloroethane, tetrachloroethane, naphthalene, tetrabromoethane and paraffin wax.

In general, it is preferred to employ an organic material which has a specific gravity substantially differing from that of the kaolin clay slurry, and it is particularly desirable to employ an organic material such as carbon tetrachloride which is more dense than the clay slurry. By so operating it is easier to ultimately separate the kaolin clay from the impurity laden organic material.

The kaolin clay, which is intimately contacted with the organic material, is in the form of an aqueous slurry containing about 5 to about 70 weight percent of clay solids. The organic material is employed in widely varying amounts ranging from about 3 volume percent to more than 100 volume percent (the maximum being primarily a question of economics); a 10 to 40 volume percent of organic material, based on the volume of the aqueous phase, is preferred. The intimate contacting may be conducted at temperatures which may range broadly from 40° F. to 200° F. Normally the temperatures are in the range of 60° F. to 100° F. The organic liquid is generally dispersed or emulsified in the clay slurry by conventional means as, for example, high speed mechanical agitation. It is preferred that the resulting emulsion be relatively unstable. The discoloring impurities appear to collect at the interface between the immiscible aqueous and organic liquid phases and are removed from the system with the organic material. This is normally readily effected by allowing the liquid phases to separate under the influence of gravity or via applied centrifugal force.

To obtain the maximum effect, the intimate contacting is effected so that the organic liquid interfacial area is relatively large. This can be accomplished in several ways, such as for example, by creating a small droplet size for the emulsion of the organic liquid in the slurry through controlling the intensity of mixing. Alternatively, relatively large volume fractions of organic material used in the process can be employed and/or the clay slurry subjected to repeated treatment with the organic material. If desired the impurities may be removed from the organic material by filtration, centrifuging, gravity sedimentation, distillation, and the like, and the organic material recycled for further contact with the kaolin clay.

A preferred embodiment involves employing a 10 to 40 weight percent aqueous slurry of kaolin clay, said weight percent being based on the amount of clay present, and contacting the slurry with 5 to 30 volume percent of the organic material at a temperature of 60 to 100° F. Good contact between the organic liquid and aqueous phases is promoted by agitation or mixing of the two phases.

After treatment with the organic material, the clay water slip may be conventionally processed. For example, the slip may be flocculated by addition of acid, bleached, filtered and dried.

If the organic material employed is normally a solid, but liquid under the conditions of treatment, for example, paraffin wax, the admixture, after being intimately contacted with such organic material, may be subjected to cooling below the melting temperature of the organic material. The organic layer thereupon forms a solid phase. The clay water phase may then be readily separated from the impurity laden organic phase by filtration, or simply by drawing the clay water phase from the container.

A variety of kaolin clays are applicable in the process of the present invention although, as in a conventional bleaching operation, the effectiveness in the color improvement of a particular kaolin clay will depend on the chemical constitution of the particular clay being treated. The English (primary) kaolins have been found to be particularly applicable in the process of the present invention. Delamination of the kaolin clay may be carried out according to the process described in U.S. Patent 3,171,718, the disclosure of which is incorporated herein. Any process of delamination, however, is applicable.

Illustrating with the process in U.S. Patent 3,171,718, an aqueous slurry of a discolored kaolin clay having 5 to 50 weight percent of clay solids is subjected to a fine mechanical milling action using fine, nonabrasive, resilient grinding media. A conventional dispersing agent, such as tetrasodium pyrophosphate or sodium silicate, may be employed to disperse the clay in the slurry. The grinding media are normally plastic and may be in the form of beads, pellets, etc. Suitable plastic grinding media include nylon, styrene-divinyl benzene copolymers, polypropylene, polyvinyl chloride and the like. The plastic grinding media may be in the form of ⅛-inch diameter pellets and may be employed in the ratio of about 1 to 4 weight parts of grinding media per part of kaolin clay. Fine resilient plastic grinding media is normally added in such quantity as deemed effective in promoting the liberation of the discoloring impurity from the kaolin clay upon subjecting the admixture to agitation. Commonly a ratio of 2 parts of resilient nonabrasive grinding media are employed per part of kaolin clay. The density and/or particle size of the scrubbing agent (plastic grinding media) may be selected so as to permit its ready separation from the kaolin clay by screening, or by gravitational sedimentation or by centrifugal sedimentation after the admixture has been subjected to agitation. The scrubbing action necessary to render the color impurities separable is brought about by a sufficiently violent agitation of the slurry so as to cause interparticle collision and friction, and is continued for such a length of time as may be found, by experiment, to be suitable for the type of starting kaolin clay material, quantity of scrubbing agent and kind of agitating apparatus employed. This time period normally ranges from 0.1 to 1 hour. This scrubbing action can be visualized as being a combination of (1) mild viscous shear milling due to agitation of the viscous mix composed of fine milling media, water and kaolin clay; (2) mild percussive milling due to the multiplicity of low inertia impacts forwarded by the collision of fine milling media with itself and with the kaolin clay; and (3) mild frictional milling produced by the combination of the rubbing action of the fine media to itself of the fine media to the kaolin clay and of kaolin clay particles with other kaolin clay particles. Such actions may occur simultaneously.

Thereafter, the delaminated kaolin clay is subjected to treatment with the organic material. The organic material may be introduced into the system during the scrubbing operation, or subsequent to the scrubbing operation and either in the presence or absence of the grinding media, the separation of the grinding media from the clay prior to treatment with the organic material normally preferred.

While the use of nonabrasive resilient grinding media is preferred for the delamination step, the delamination of the kaolin clay particles may be effected by the use of a variety of other grinding operations. Thus, the kaolin clay may be subjected, preferably in the form of a water slurry, to abrasion with various other grinding media, such as sand, porcelain, metal balls such as iron, rubber covered iron or nickel shot.

The grinding media may be separated by screening or by settling the grinding media or by other conventional steps, prior to treatment with the organic material. Thereafter the slurry concentrate can be adjusted as desired, for example, diluted to reach optimum conditions for contact with the organic material.

The following examples are given to aid in understanding the invention but it is to be understood that the invention is not restricted to the specific compositions or conditions of application given in the examples. Said examples are illustrative only and should not be construed as limiting the invention which is delineated in the appended claims.

Example 1

A sample of discolored kaolin clay having a GE brightness of 80.6 and which represented the coarsest fraction ordinarily obtained by usual processing techniques and which contained 66 weight percent of particles above five microns in size and 20 weight percent of particles below two microns in size (all particle sizes referring to equivalent spherical diameters) was "scrubbed" by agitation for 15 minutes in the presence of 18 to 45 mesh polystyrene beads. Two weight parts of polystyrene beads were employed per one part of clay, the clay being in the form of a clay water slurry having a solids content of 40 percent by weight. The fine resilient nonabrasive grinding media was then removed from the slip by screening through a 100 mesh sieve.

Half the resulting clay slip was flocculated, bleached, filtered and dried in the conventional manner. To the other half of the clay slip carbon tetrachloride was aded so as to represent approximately 20 volume percent of the mixture. The aqueous slurry-carbon tetrachloride mixture was then agitated with a high speed mixer for five minutes, the temperature of the mixture during the agitaion being approximately 90° F. The agitation was then halted and the aqueous organic phases were allowed to separate by static settling. The clay water layer was removed, and the clay water slip then treated by the usual techniques of flocculation, bleaching, filtration and drying, according to conventional techniques, to obtain the product material. The relative GE brightness of the pigment obtained were as follows:

GE brightness
Milled clay contacted with organic liquid _____ 87.7
Milled clay but not contacted with organic liquid ___ 83.3

A control sample, in the absence of both the milling step and the contact with the organic liquid, had a GE brightness of 80.6.

Example 2

A sample of discolored kaolin clay having a GE brightness below 81 and which represented the coarsest fraction ordinarily obtained by usual processing techniques and which contained 66 weight percent of particles above five microns in size and 20 weight percent of particles below two microns in size (all particle sizes referring to equivalent spherical diameters) was treated, as in Example 1, except that the fine media milling step was continued for 30 minutes. Thereafter a portion of the milled clay was contacted with carbon tetrachloride. The results were as follows:

GE brightness
Milled clay only _____ 79.2
Milled clay treated with carbon tetrachloride _____ 87.8

Example 3

The process of Example 2 was repeated with a discolored kaolin clay except that the fine media milling was continued for two hours. A portion of the milled clay was then subjected to treatment with carbon tetrachloride. Results were as follows:

GE brightness
Milled clay only _____ 75.9
Treated milled clay with carbon tetrachloride _____ 85.9

Example 4

The process of Example 2 was repeated with a discolored kaolin clay, except that the milling was continued for four hours. Results were as follows:

GE brightness
Milled clay only _____ 72.6
Treated milled clay with carbon tetrachloride _____ 85.5

Example 5

A second sample of coarse kaolin clay, of the type sometimes used as a filler clay, was treated as in Example 1. The coarse kaolin clay had an initial GE brightness of 80.0.

The fine media milling operation was conducted as in Example 1, except that milling was continued for one hour. Thereafter, as in Example 1, the milled clay material was separated from the grinding media by screening through a 100 mesh screen to remove the grinding media, and thereafter classified by gravity sedimentation into a fine particle size of 82 weight percent below two microns.

Part of the resulting fine sized milled clay material was then treated with carbon tetrachloride, as in Example 1, and a part not treated and employed as a control. Results were as follows:

GE brightness
Fine milled clay only _____ 85.2
Fine milled clay treated with carbon tetrachloride __ 90.6

Example 6

An aqueous slurry of a primary kaolin clay, namely, an English crude clay, type GBB, and containing 30 percent solids, was treated with polystyrene beads, 3 weight parts of the plastic beads being employed per weight part of English clay. About 0.1 weight percent, based on the weight of the clay solids, of tetrasodium pyrophosphate was used to aid dispersion. The admixture of fine grinding media and clay was agitated for 1 hour in the same manner described in Example 1. The fine fraction of the resulting clay material, such as would be used as a paper coating clay, was then isolated in the same manner as described in Example 5. Thereafter a portion of the fine fraction of the clay was emulsified with toluene (i.e. an organic liquid having a specific gravity less than the clay water slurry). Approximately 5 volume percent of toluene was employed per total volume of the clay water slurry. The toluene was mixed with the clay water slurry and agitated by the use of a propeller-type mixer. Agitation was conducted at a temperature of about 70° F. for 30 minutes.

Thereafter the aqueous clay containing phase was separated from the toluene, color impurity containing phase by allowing the mixture to separate upon standing, and the toluene layer, having a lower specific gravity, drawn off from the upper portion of the vessel.

The clay which had been treated with toluene was recovered by filtration, and dried in a conventional manner.

The brightness of the English clay so treated was compared with the brightness of the same sample which had not been subjected to emulsification with toluene, but which had been otherwise similarly treated.

GE brightness
Milled clay with toluene _____ 89.1
Clay simply milled _____ 83.5

Example 7

Another English crude clay, denoted in the trade as type HB, was treated as in Example 6, except that the fine portion of the clay was admixed with carbon tetrachloride rather than toluene. Sufficient carbon tetrachloride was added to the clay water slurry to give approximately 20 volume percent carbon tetrachloride based on the aqueous mixture and the mixture thereafter agitated with a high speed mixer (6000 r.p.m.) for 15 minutes. The clay was then recovered as described in Example 6, and its GE brightness determined.

|   | GE brightness |
|---|---|
| Clay milled only | 85.0 |
| Clay milled and treated with carbon tetrachloride | 88.6 |

Example 8

A coarse fraction obtained from an English crude koalin clay, type HB, by sedimentation, was dispersed in water, and subjected to a fine media milling for 1 hour, as in Example 6. Sufficient carbon tetrachloride was then contacted with a portion of the clay water slurry to give approximately 20 volume percent carbon tetrachloride, based on the aqueous mixture, and the mixture thereafter agitated with a high speed mixer (6000 r.p.m.) for 15 minutes. The remaining portion of the clay was not treated with the carbon tetrachloride. Results were as follows:

|   | GE brightness |
|---|---|
| Milled clay only | 79.8 |
| Clay treated with carbon tetrachloride after milling | 85.7 |

Example 9

The experiment of Example 8 was repeated except that after milling with the fine grinding media, the clay was classified to obtain a fine fraction such as would be suitable for use as a paper coating clay. Then a part of this fine fraction was subjected to a washing with carbon tetrachloride while a second part was not treated. Results are indicated below:

|   | GE brightness |
|---|---|
| Milled fine clay, no treatment with carbon tetrachloride | 65.0 |
| Milled fine clay treated with carbon tetrachloride | 78.0 |

Example 10

Another coarse fraction of English crude kaolin clay, type HB, was obtained by sedimentation leaving behind a fine fraction of English crude clay, type HB. The coarse fraction was then treated in exactly the same manner described relative to Example 8. The results are reported below.

|   | GE brightness |
|---|---|
| Milled clay, only | 86.4 |
| Milled clay treated with carbon tetrachloride | 88.1 |

Example 11

A 20 weight percent, by solids, of an aqueous slurry of a fine fraction of clay, from the English crude HB clay, obtained in preparing the sample for Example 10, was intimately contacted with carbon tetrachloride. Sufficient carbon tetrachloride was added to give a 30 volume percent of organic liquid based on total volume of the aqueous mixture. A strong agitation was conducted for approximately 15 minutes at a temperature of 80° F. by using a Waring Blendor. The clay was recovered from the resulting admixture by allowing the two layers to separate, removing the clay water slurry through use of a separately funnel, filtering the clay from the clay water slurry and drying the filtered clay.

Thereafter, brightness of the resulting clay product was measured and compared with a portion of the clay material which had not been treated with carbon tetrachloride.

|   | GE brightness |
|---|---|
| Clay not treated with carbon tetrachloride | 89.1 |
| Clay treated with carbon tetrachloride | 90.4 |

Example 12

An aqueous slurry of a composite mixture of 63.5 weight percent of the fine clay employed in Example 11 and 36.5 percent of the fine clay of Example 7, was intimately contacted with sufficient carbon tetrachloride to give 30 volume percent organic liquid based on the total volume of the aqueous mixture. Agitation was conducted for approximately 15 minutes at a temperature of 80° F. by the use of a Waring Blendor. The clay was recovered from the resulting admixture by allowing the two layers to separate, removing the clay water slurry through use of a separatory funnel, filtering the clay from the clay water slurry and drying the filtered clay.

Thereafter, brightness of the resulting clay product was measured and compared with material which had not been treated with carbon tetrachloride.

The results were as follows:

|   | GE brightness |
|---|---|
| Untreated clay mixture | 85.9 |
| Clay treated with carbon tetrachloride | 89.8 |

Example 13

An English crude kaolin clay, type HB, was slurried in water at 30 percent solid by weight. Thereafter tetrasodium pyrophosphate (0.3 weight percent based on the weight of dry clay) was added to disperse the clay. Styrene-divinyl-benzene copolymer beads (18–40 mesh) were then added to give a 2:1 bead to clay weight ratio. The mixture was then agitated for 15 minutes and allowed to undergo sedimentation. A coarse particle sediment (7.3 percent) was discarded. The remaining mixture was then agitated for another hour. The beads thereupon were removed by screening (100 mesh screen) and the clay water slurry allowed to again settle. Another 4.6 percent of a coarse sediment was discarded and the remaining clay (88.9 percent by weight of the total) was bleached with sodium hydrosulfite, recovered from the slurry by filtration and dried. On redispersion with water, using 0.1 weight percent based on the weight of dry clay of tetrasodium pyrophosphate as a dispersing agent, and subjecting the aqueous dispersion to a carbon tetrachloride extraction and recovering the clay, as described in the previous examples the following results were obtained:

|   | GE brightness |
|---|---|
| Milled clay not treated with carbon tetrachloride | 87.4 |
| Milled clay treated with carbon tetrachloride | 89.4 |

Example 14

Using a sump pump a mixture was prepared of 150 gallons of 17% solids delaminated clay water slip (prepared as in Example 1) and 6 gallons of kerosene. A 10 cc. portion of an antifoam agent (Dow silicone antifoam agent "B") was added to minimize foaming. The mixture was then allowed to separate and a grey-black discoloring impurity, which contained graphite among other impurities, collected at the interface. The clay was recovered and treated by conventional procedures and was found to have a GE brightness of 90.3. A sample of the starting material, not extracted with kerosene, but otherwise treated in exactly the same manner, had a GE brightness of 88.8. The extraction sample also had a much more satisfactory color than the unextracted sample.

In the foregoing examples, substitution of 1,2-dichloroethane, tetrabromoethane and paraffin wax, among others, for the carbon tetrachloride, kerosene, and toluene, under conditions such that the organic material is liquid on contact with the kaolin clay, will give an improved brightness to the kaolin clay.

For brevity, various features have been illustrated and described in connection with a limited number of illustrative embodiments. It is intended that these features be used also in combination with features shown in other embodiments without departing from the spirit of the invention.

What is claimed is:

1. A process for improving the brightness characteristics of a kaolin clay which consists essentially of (a) adding, at 40° to 200° F., to an aqueous dispersion of a delaminated kaolin clay containing a dispersing agent a substantially water-insoluble, non-ionizable organic material which is liquid under the conditions of contact with the delaminated kaolin clay and which gives an interfacial tension against water of from 20 to 55 dynes per centimeter at 40° F. to 200° F., the amount of said organic material being at least 3 volume percent of the volume of the aqueous phase, (b) subjecting the mixture to agitation for a period of time sufficient to allow intimate mixing of the two phases and to form an unstable emulsion, (c) allowing the mixture to stand until the organic phase separates from the aqueous phase, (d) thereupon separating the dispersed clay water phase from the organic phase and from any material which collects at the interface of the two phases, and (e) recovering a clay product of improved brightness from the aqueous phase, the organic liquid being the sole chemical reagent required for effecting separation of discoloring solid organic impurities from the aqueous dispersed delaminated kaolin clay.

2. A process for improving the brightness characteristics of a kaolin clay which consists essentially of (a) adding, at 40° to 200° F., to an aqueous dispersion of a delaminated kaolin clay containing a dispersing agent, said dispersion containing about 5 to about 70 weight percent of clay solids, a substantially water-insoluble, non-ionizable organic material which is liquid under the conditions of contact with the delaminated kaolin clay and which gives an interfacial tension against water of from 20 to 55 dynes per centimeter at 40° F. to 200° F., the amount of said organic material being at least 3 volume percent of the volume of the aqueous phase, (b) subjecting the mixture to agitation for a period of time sufficient to allow intimate mixing of the two phases and to form an unstable emulsion, (c) allowing the mixture to stand until the organic phase separates from the aqueous phase, (d) thereupon separating the dispersed clay water phase from the organic phase and from any material which collects at the interface of the two phases, and (e) recovering a clay product of improved brightness from the aqueous phase, the organic liquid being the sole chemical reagent required for effecting separation of discoloring solid organic impurities from the aqueous dispersed delaminated kaolin clay.

3. A process for improving the brightness characteristics of a kaolin clay which consists essentially of (a) adding, at 40° to 200° F., carbon tetrachloride to an aqueous dispersion of a delaminated kaolin clay containing a dispersing agent, the amount of said carbon tetrachloride being at least 3 volume percent of the volume of the aqueous phase, (b) subjecting the mixture to agitation for a period of time sufficient to allow intimate mixing of the two phases and to form an unstable emulsion (c) allowing the mixture to stand until the organic phase separates from the aqueous phase, (d) thereupon separating the dispersed clay water phase from the organic phase and from any material which collects at the interface of the two phases, and (e) recovering a clay product of improved brightness from the aqueous phase, the carbon tetrachloride being the sole chemical reagent required for effecting separation of discoloring solid organic impurities from the aqueous dispersed delaminated kaolin clay.

4. A process for improving the brightness characteristics of a kaolin clay which consists essentially of (a) adding, at 40° to 200° F., toluene to an aqueous dispersion of a delaminated kaolin clay containing a dispersing agent, the amount of said toluene being at least 3 volume percent of the volume of the aqueous phase, (b) subjecting the mixture to agitation for a period of time sufficient to allow intimate mixing of the two phases and to form an unstable emulsion (c) allowing the mixture to stand until the organic phase separates from the aqueous phase, (d) thereupon separating the dispersed clay water phase from the organic phase and from any material which collects at the interface of the two phases, and (e) recovering a clay product of improved brightness from the aqueous phase, the toluene being the sole chemical reagent required for effecting separation of discoloring solid organic impurities from the aqueous dispersed delaminated kaolin clay.

5. A process for improving the brightness characteristics of a kaolin clay which consist essentially of (a) adding, at 40° to 200° F., kerosene to an aqueous dispersion of a delaminated kaolin clay containing a dispersing agent, the amount of said kerosene being at least 3 volume percent of the volume of the aqueous phase, (b) subjecting the mixture to agitation for a period of time sufficient to allow intimate mixing of the two phases and to form an unstable emulsion, (c) allowing the mixture to stand until the organic phase separates from the aqueous phase, (d) thereupon separating the dispersed clay water phase from the organic phase and from any material which collects at the interface of the two phases, and (e) recovering a clay product of improved brightness from the aqueous phase, the kerosene being the sole chemical reagent required for effecting separation of discoloring solid organic impurities from the aqueous dispersed delaminated kaolin clay.

6. A process for improving the brightness characteristics of a kaolin clay which consists essentially of (a) adding, at 40° to 200° F., to an aqueous dispersion of a milled kaolin clay containing a dispersing agent, a substantially water-insoluble non-ionizable organic material which is liquid under the conditions of contact with the kaolin clay and which gives an interfacial tension against water of from 20 to 55 dynes per centimeter at 40° F. to 200° F., the amount of said organic material being at least 3 volume percent of the volume of the aqueous phase, (b) subjecting the mixture to agitation for a period of time sufficient to allow intimate mixing of the two phases and to form an unstable emulsion, (c) allowing the mixture to stand until the organic phase separates from the aqueous phase, (d) thereupon separating the dispersed clay water phase from the organic phase and from any material which collects at the interface of the two phases, and (e) recovering a clay product of improved brightness from the aqueous phase, the organic liquid being the sole chemical reagent required for effecting separation of discoloring solid organic impurities from the aqueous dispersed milled kaolin clay.

7. A process for improving the brightness characteristics of a kaolin clay according to claim 6 wherein the substantially water-insoluble, nonionizable organic material is carbon tetrachloride.

8. A process for improving the brightness characteristics of a kaolin clay which consists essentially of (a) adding, at 40° to 200° F., to an aqueous dispersion of a milled kaolin clay containing a dispersing agent, said dispersion containing about 5 to about 70 weight percent of clay solids, a substantially water-insoluble, non-ionizable organic material which is liquid under the conditions of contact with the kaolin clay and which gives an interfacial tension against water of from 20 to 55 dynes per centimeter at 40° F. to 200° F., the amount of said organic material being at least 3 volume percent of the volume of the aqueous phase, (b) subjecting the mixture to agitation for a period of time sufficient to allow intimate mixing of the two phases and to form an unstable emulsion, (c) allowing the mixture to stand until the organic phase separates from the aqueous phase, (d) thereupon separating the dispersed clay water phase from the organic phase and from any material which collects at the interface of the two phases, and (e) recovering a clay product of improved brightness from the aqueous phase, the organic liquid being the sole chemical reagent required for effecting separation of discoloring solid organic impurities from the aqueous dispersed milled kaolin clay.

9. A process for improving the brightness characteristics of a kaolin clay which consists essentially of (a) adding, at 40° to 200° F., toluene to an aqueous dispersion of a milled kaolin clay containing a dispersing agent, the amount of toluene being at least 3 volume percent of the volume of the aqueous phase, (b) subjecting the mixture to agitation for a period of time sufficient to allow intimate mixing of the two phases and to form an unstable emulsion, (c) allowing the mixture to stand until the organic phase separates from the aqueous phase, (d) thereupon separating the dispersed clay water phase from the organic phase and from any material which collects at the interface of the two phases, and (e) recovering a clay product of improved brightness from the aqueous phase, the toluene being the sole chemical reagent required for effecting separation of discoloring solid organic impurities from the aqueous dispersed milled kaolin clay.

10. A process for improving the brightness characteristics of a kaolin clay which consists essentially of (a) adding, at 40° to 200° F., kerosene to an aqueous dispersion of a milled kaolin clay containing a dispersing agent, the amount of kerosene being at least 3 volume percent of the volume of the aqueous phase, (b) subjecting the mixture to agitation for a period of time sufficient to allow intimate mixing of the two phases and to form an unstable emulsion, (c) allowing the mixture to stand until the organic phase separates from the aqueous phase, (d) thereupon separating the dispersed clay water phase from the organic phase and from any material which collects at the interface of the two phases, and (e) recovering a clay product of improved brightness from the aqueous phase, the kerosene being the sole chemical reagent required for effecting separation of discoloring solid organic impurities from the aqueous dispersed milled kaolin clay.

11. A process for improving the brightness characteristics of a delaminated English kaolin clay which consists essentially of (a) adding, at 40° to 200° F., to an aqueous dispersion of a delaminated English clay containing a dispersing agent a substantially water-insoluble organic material which is liquid under the conditions of contact with the kaolin clay and which gives an interfacial tension against water of from 20 to 55 dynes per centimeter at 40° F. to 200° F., the amount of said organic material being at least 3 volume percent of the volume of the aqueous phase, (b) subjecting the mixture to agitation for a time sufficient to allow intimate mixing of the two phases and to form an unstable emulsion, (c) allowing the mixture to stand until the organic phase separates from the aqueous phase, (d) and then separating the dispersed clay water phase from the organic phase and from any material which collects at the interface of the two phases, and (e) recovering a clay product of improved brightness from the aqueous phase, the organic liquid being the sole chemical reagent required for effecting separation of discoloring solid organic impurities from the aqueous dispersed delaminated kaolin clay.

12. A process for improving the brightness characteristics of a milled English kaolin clay which consists essentially of (a) adding, at 40° to 200° F., to an aqueous dispersion of a milled English clay containing a dispersing agent a substantially water-insoluble organic material which is liquid under the conditions of contact with the kaolin clay and which gives an interfacial tension against water of from 20 to 55 dynes per centimeter at 40° F. to 200° F., the amount of said organic material being at least 3 volume percent of the volume of the aqueous phase, (b) subjecting the mixture to agitation for a time sufficient to allow intimate mixing of the two phases and to form an unstable emulsion, (c) allowing the mixture to stand until the organic phase separates from the aqueous phase, (d) and then separating the dispersed clay water phase from the organic phase and from any material which collects at the interface of the two phases, and (e) recovering a clay product of improved brightness from the aqueous phase, the organic liquid being the sole chemical reagent required for effecting separation of discoloring solid organic impurities from the aqueous dispersed milled kaolin clay.

References Cited

UNITED STATES PATENTS

| | | | |
|---|---|---|---|
| 667,222 | 2/1901 | Ivery | 209—5 |
| 3,171,718 | 3/1965 | Gunn | 23—110 |
| 689,070 | 12/1901 | Elmore | 209—171 |
| 766,289 | 8/1904 | Schwarz | 209—171 |
| 2,150,917 | 3/1939 | Foulke | 209—172 |
| 2,652,338 | 9/1953 | Greger | 106—72 X |
| 2,686,592 | 8/1954 | Miller | 209—163 |
| 2,920,832 | 1/1960 | Duke | 241—23 |
| 3,097,801 | 7/1963 | Duke | 241—16 |
| 3,224,582 | 12/1965 | Iannicelli | 209—166 |
| 3,253,791 | 5/1966 | Cohn | 241—16 X |
| 3,259,326 | 7/1966 | Duke | 209—166 X |

HARRY B. THORNTON, *Primary Examiner.*

ROBERT HALPER, *Assistant Examiner.*

U.S. Cl. X.R.

23—110; 106—72; 209—171; 241—23.